United States Patent [19]

Iwasa et al.

[11] Patent Number: 5,132,578
[45] Date of Patent: Jul. 21, 1992

[54] STEPPING MOTOR FOR TIMEPIECE

[75] Inventors: Toru Iwasa; Noboru Watanabe; Syouichi Mitsugi; Katsumi Yokota, all of Saitama, Japan

[73] Assignee: Jeco Company, Ltd., Gyoda, Japan

[21] Appl. No.: 482,789

[22] Filed: Feb. 21, 1990

[30] Foreign Application Priority Data

Feb. 28, 1989 [JP] Japan .................. 1-47539

[51] Int. Cl.⁵ .............................................. H02K 37/00
[52] U.S. Cl. ................................. 310/49 R; 310/112; 310/156; 310/254
[58] Field of Search ............... 310/49 R, 156, 162, 310/163, 164, 165, 40 MM, 112, 257, 180, 254, 259, 216

[56] References Cited

U.S. PATENT DOCUMENTS

| | | | |
|---|---|---|---|
| 3,256,453 | 6/1966 | Haydon | 310/156 |
| 3,989,967 | 11/1976 | Kikuyama | 310/49 R |
| 4,217,509 | 8/1980 | Sudler | 310/49 R |
| 4,629,924 | 12/1986 | Grosjean | 310/156 |
| 4,636,668 | 1/1987 | Nikaido | 310/49 R |
| 4,794,292 | 12/1988 | Torisawa | 310/49 R |

Primary Examiner—R. Skudy
Attorney, Agent, or Firm—Blakely, Sokoloff, Taylor & Zafman

[57] ABSTRACT

A stepping motor for a timepiece is constituted by a rotatable rotor magnet on an outer surface of which magnetic poles having different polarities are alternately formed, and two stator assemblies, each including a pair of stators opposing around the rotor magnet to have a gap and having stator magnetic pole portions, and an excitation coil for exciting the pair of stators, for supplying currents to the excitation coils to rotate the rotor magnet. The two stator assemblies are disposed to be separated by a predetermined distance in an axial direction of the rotor magnet, so that stator gap central lines of the two stator assemblies cross each other at an angle of 90° when viewed from the axial direction.

2 Claims, 6 Drawing Sheets

STEPPING MOTOR FOR TIMEPIECE

BACKGROUND OF THE INVENTION

The present invention relates to a stepping motor suitably applied to a driving motor for a timepiece using a quartz oscillator.

So-called quartz timepieces using a quartz oscillator have been popular. Some quartz timepieces, e.g., timepieces equipped at non-accessible locations, e.g., in station precincts, on wall surfaces, and the like are required to quickly and accurately correct time by a remote operation. As a motor applied to a quartz timepiece which can be remote-operated, a two-phase excitation type stepping motor which can be rotated in opposite directions by controlling phases of signals supplied to an excitation coil is known.

FIGS. 6 and 7 show a conventional two-phase excitation type stepping motor for a timepiece. FIG. 6 is a plan view of the stepping motor, and FIG. 7 is a plan view thereof.

In FIGS. 6 and 7, a rotor magnet 1 is formed of a columnar ferrite Magnetic poles N1, S1, N2, S2, N3, and S3 are magnetized at equal angular intervals (60°) on the outer surface of the rotor magnet 1 so that different magnetic poles alternately appear. The rotor magnet 1 is rotatably supported by receiving plates 21a and 21b (FIG. 7) fixed to a rotor shaft 20.

Reference numerals 22 and 23 denote flat stators, formed of a planar material, for forming a closed circuit through the rotor magnet 1. Semi-circular recesses are formed in stator magnetic pole portions 22a and 23a of the stators 22 and 23. The semi-circular recesses oppose the outer surface of the rotor magnet 1 to have gaps therebetween.

Gap portions 24a and 24b whose two-end portions oppose each other to have a predetermined gap therebetween are formed on magnetic pole ends of the stator magnetic pole portions 22a and 23a at positions symmetrical about the rotational center of the rotor magnet 1. Two pairs of notch portions 22b and 23b, and 22c and 23c are formed in the inner surfaces of the recesses of the stator magnetic pole portions 22a and 23a at positions symmetrical about the rotational center. The notch portion 22b is formed at a 45° position in a clockwise direction to have its opposing central line 100 as the center. The notch portion 22c is formed at a 15° position in a counterclockwise direction to have the opposing central line 100 as the center. The gap portion 24a is formed at a 75° position in the counterclockwise direction having the opposing central line 100 as the center. The still position of the rotor magnet 1 is determined by the positions of the notch portions 22b, 22c, 23b, and 23c. In FIG. 6, the rotor magnet 1 stands still between the magnetic pole portions of the stators while the notch portions 22b, 22c, 23b, and 23c are located respectively between the magnetic poles S3 and N1, between N1 and S1, between N2 and S2, and between S2 and N3.

A coil 25b wound around a bobbin 25a is provided to base portions 22d and 23d as ends opposite to the stator magnetic portions 22a and 23a of the stators 22 and 23. When he coil 25b is energized, the stator magnetic pole portions 22a and 23a are energized.

An upper stator assembly has been described. A lower stator assembly has the same structure as the upper stator assembly. Reference numerals 26 and 27 denote stators; 26b, 26c, 27b, and 27c, notch portions; 26a and 27a, stator magnetic pole portions; 26d and 27d, base portions; 28a and 28b, gap portions; 29a, a bobbin; and 29b, a coil. The gap portions 28b and 28a of the lower stator assembly are located at position symmetrical with the gap portions 24a and 24b of the upper stator assembly about the opposing central line 100. The notch portions 26b, 26c, 27b, and 27c of the lower stator assembly are located at positions symmetrical with the notch portions 22b, 22c, 23b, and 23c of the upper stator assembly about the opposing central line 100. More specifically, angles defined by the notch portions 22b and 26b and by the notch portions 23b and 27b of the notch portions, four each formed in the upper and lower stator assemblies, for determining rotor still positions are set at 90° to have the opposing central line 100 as the center, and angles defined by the notch portions 22c and 26c and by the notch portions 23c and 27c are set at 30° to have the opposing central line 100 as the center.

Note that the stators 22 and 23 and the stators 26 and 27 are held by intermediate plates 20a of a nonmagnetic material to be separated at a predetermined distance in an axial direction. As a result, the stator magnetic pole portions 22a and 23a oppose the upper portion of the rotor magnet 1, and the stator magnetic pole portions 26a and 27a oppose the lower portion of the rotor magnet 1.

In this structure, when the coils 25b and 29b are energized to 2-2-phase excite the stators 22, 23, 26, and 27, four excitation patterns, i.e., (N, S, N, S), (N, S, S, N), (S, N, S, N), and (S, N, N, S) can be obtained.

In the third pattern, i.e., when the stators 22 and 26 are excited in the S pole and the stators 23 and 27 are excited in the N pole, the strength and direction of a magnetic field generated by the stators, and the strength and direction of a synthesized vector are as shown in FIG. 8. In FIG. 8, reference symbol $\alpha$ denote a magnetic field strength from the N pole to the S pole in the upper stator assembly (the stators 22 and 23); and $\alpha'$, a magnetic field strength from the N pole to the S pole in the lower stator assembly (the stators 26 and 27). The strengths of the two magnetic fields are equal to each other, i.e., $\alpha = \alpha'$. These magnetic fields are inclined at an angle $\theta$ in clockwise and counterclockwise directions with respect to the Y-axis (opposing central line 100). Reference numeral $\beta$ denotes a synthesized vector of the magnetic fields $\alpha$ and $\alpha'$.

When the direction of a current to be supplied to the coil 29b is reversed so that the polarities of only the lower stators 17 and 18 are inverted, i.e., the stators 26 and 27 are excited to be magnetized in the N and S poles, respectively (the fourth excitation pattern). The strengths $\alpha$ and $\alpha'$ and directions of the magnetic fields and the strength and direction of a synthesized vector $\beta'$ are as shown in FIG. 9.

Therefore, the direction of the synthesized vector $\beta$ shown in FIG. 8 is changed clockwise through 90°, and the rotor magnet 1 is rotated clockwise through 30°. When the fourth excitation pattern is switched to the first excitation pattern, the synthesized vector $\beta$ is further rotated clockwise through 90° from the state shown in FIG. 9. When the first excitation pattern is switched to the second excitation pattern, the synthesized vector is further rotated clockwise through 90°. In this manner, when the excitation patterns are successively changed, the rotor magnet 1 can be continuously rotated in a predetermined direction. Note that when the switching order of the excitation pattern is reversed to that described above, the rotor magnet 1 is rotated counterclockwise.

Every time the synthesized vector is rotated through 90°, the rotor magnet 1 is rotated stepwise through 30°. The stop position after the 30° rotation is determined by the positions of the notch portions.

In the conventional stepping motor for a timepiece, in consideration of the excitation patterns of the stators, the direction of the synthesized vector $\beta$ of the magnetic field strengths $\alpha$ and $\alpha'$ is changed through 90°, and its magnitude is also changed ($\beta \approx 3.7\beta'$). Therefore, a rotational torque applied to the rotor magnet 1 varies every time the rotor magnet is rotated through 90°, resulting in poor stepping angle precision as a timepiece. In particular, when the magnitude of the synthesized vector $\beta$ is changed, the rotor magnet which can be easily rotated by a large synthesized vector may not often be rotated by a small synthesized vector. For this reason, a torque for rotating the magnet by a small synthesized vector must be set. In this case, in order to obtain a desired torque, a rotor magnet of an expensive material must be used, or a stator material, windings or specifications of windings must be changed, resulting in an expensive timepiece.

Therefore, it is required to obtain a constant synthesized vector even when the excitation patterns are switched.

As a current to be supplied to the coil, rectangular pulses generated by a pulse generator are used. When a pulse current having a duty factor of 50% is used, a sufficient drive current is flowed. For this reason, after the rotor magnet is rotated through 30°, a magnetic force from the stators acts on the rotor magnet as a braking force, thus stopping the rotor magnet 1 at the correct position. However, when the stepping motor is used in a timepiece, a pulse current having a small pulse width (i.e., a small duty factor) is used since current consumption must be minimized. In this case, since the braking force is decreased, the rotor magnet cannot be stopped at a 30° correct position by the conventional formed notch portions, and may be stopped at a 15° or 45° position. Since the stepping motor for a timepiece drives a second hand of a timepiece, if the stop position of the rotor magnet varies upon every stop, this variation directly influences movement of the second hand, resulting in poor quality as a timepiece.

SUMMARY OF THE INVENTION

It is therefore an object of the present invention to provide a stepping motor for a timepiece, which can always obtain a constant synthesized vector and can obtain a constant rotational torque even if an excitation pattern is switched, thereby improving stepping angle precision for a timepiece.

In order to achieve the above object, according to the present invention, there is provided a stepping motor for a timepiece, comprising a rotatable rotor magnet on an outer surface of which magnetic poles having different polarities are alternately formed, and two stator assemblies, each comprising a pair of stators opposing around the rotor magnet to have a gap and having stator magnetic pole portions, and an excitation coil for exciting the pair of stators, for supplying currents to the excitation coils to rotate the rotor magnet, wherein the two stator assemblies are disposed to be separated by a predetermined distance in an axial direction of the rotor magnet, so that stator gap central lines of the two stator assemblies cross each other at an angle of 90° when viewed from the axial direction.

DESCRIPTION OF THE PREFERRED EMBODIMENT

An embodiment of the present invention will be described below with reference to the accompanying drawings.

Figure 1A:
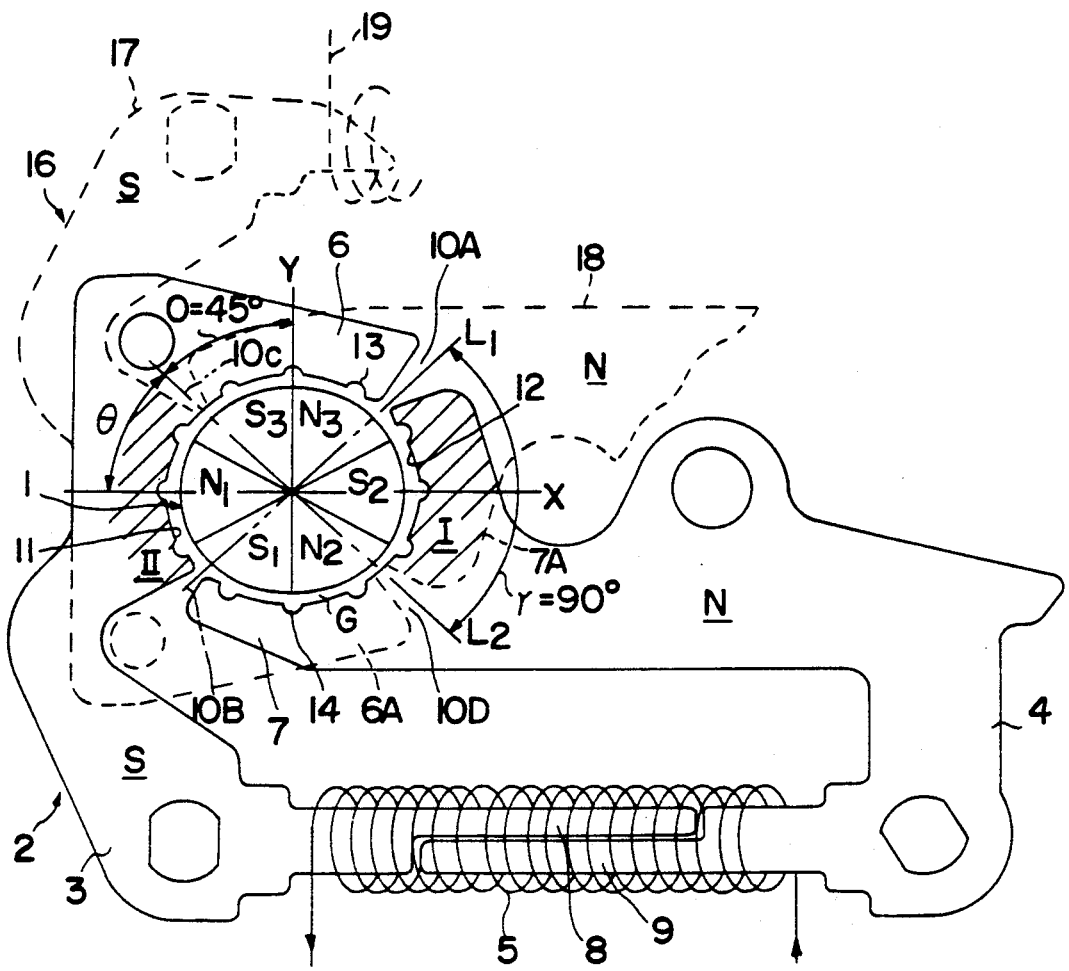
FIGS. 1(a) and 1(b) are respectively a plan view of a rotor magnet and a stator according to an embodiment of a stepping motor of the present invention, and a vector chart of magnetic fields.
Figure 1B:
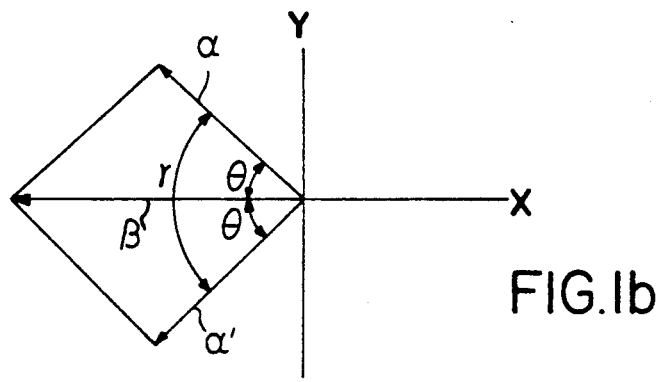
Figure 9:
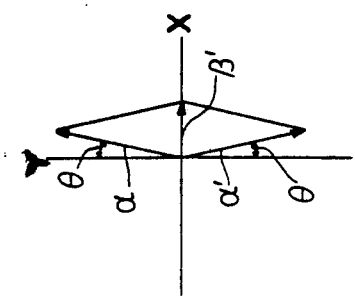
FIGS. 8 and 9 are vector charts of magnetic fields.
Figure 8:
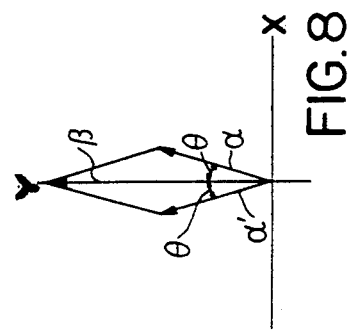
Figure 2:
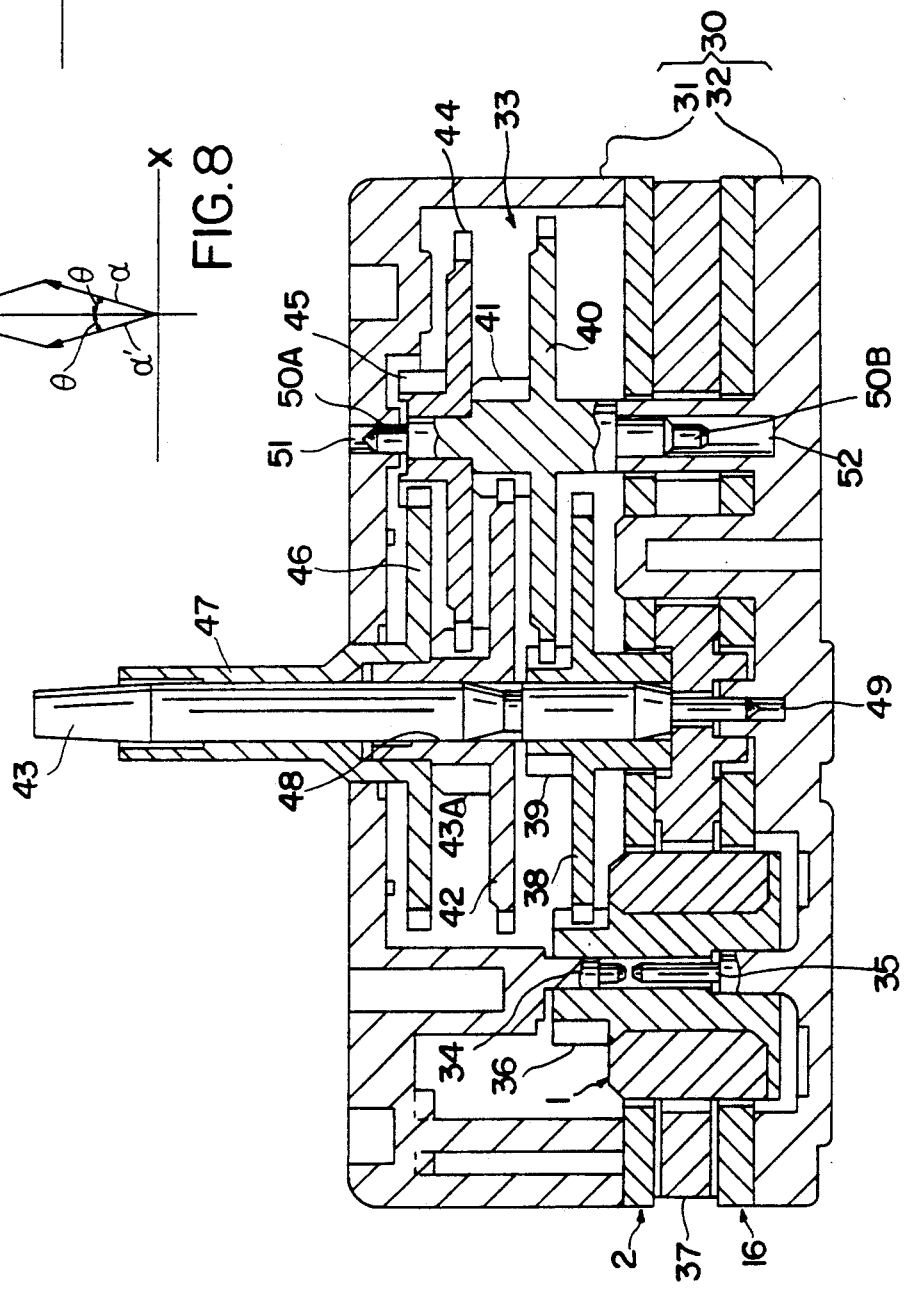
FIG. 2 is a sectional view of the stepping motor shown in FIG. 1.

FIGS. 1(a) and 1(b) respectively show a rotor and a stator assembly according to an embodiment of a stepping motor for a timepiece of the present invention, and a vector chart of magnetic fields, and FIG. 2 shows the timepiece incorporating the motor. In FIG. 1(a), reference numeral 1 denotes a rotor magnet formed into a cylindrical or columnar shape. The rotor magnet 1 is axially supported to be rotatable about its axis. Three pairs, i.e., six magnetic poles $N_1$, $N_2$, $N_3$, $S_1$, $S_2$, and $S_3$ are formed at equal angular intervals (60°) in a circumferential direction on the outer surface of the rotor magnet 1, so that different poles alternately appear. Reference numeral 2 denotes an upper stator assembly disposed around the rotor magnet 1. The stator assembly 2 comprises a pair of left and right stators 3 and 4 which are arranged on the same plane perpendicular to the axis of the rotor magnet 1 and form a magnetic circuit through the rotor magnet 1, and an excitation coil 5 for exciting these stators 3 and 4. Stator magnetic pole portions 6 and 7 are respectively formed on one-end portions of the stators 3 and 4 to oppose the outer periphery of the rotor magnet 1 to have an appropriate gap G. The excitation coil 5 is commonly wound around the other-end portions 8 and 9 of the stators 3 and 4. The stator magnetic pole portions 6 and 7 have semi-circular recess portions so that they surround the outer periphery of the rotor magnet 1 over a range of about 180°. Gap portions 10A and 10B are respectively defined between two opposing end portions of the stator magnetic pole portions 6 and 7. A line (stator gap central line) $L_1$ connecting the centers of these gap portions 10A and 10B is inclined at an angle $\theta$ ($\theta = 15°$) in a counterclockwise direction with respect to a Y-axis, thus determining the rotational direction of the rotor magnet 1 in a predetermined direction. Stator notches 13 and 14 (six each) for determining a still position of the rotor magnet 1 and improving stepping angle precision as a timepiece are formed at predetermined angular intervals (30°) in a circumferential direction in opposing curved surfaces 11 and 12 of the stator magnetic pole portions 6 and 7, which oppose the rotor magnet 1.

Reference numeral 16 denotes a lower stator assembly which is arranged around the rotor magnet 1 below the upper stator assembly 2 to overlap it at a predetermined interval in an upside down state. The lower stator assembly 16 has the same structure as that of the upper stator assembly 2, i.e., comprises a pair of left and right stators 17 and 18, and an excitation coil 19 for exciting the stators 17 and 18. Stator magnetic pole portions 6A and 7A are respectively formed on one-end portions of the stators 17 and 18 to surround the outer periphery of the rotor magnet 1 over a range of about 180°. A line (stator gap central line) $L_2$ connecting the centers of gap portions 10C and 10D formed on two end portions of these stator magnetic pole portions 6A and 7A is inclined at an angle $\theta$ ($\theta = 15°$) with respect to the Y-axis. Therefore, the line $L_2$ crosses the stator gap central line $L_1$ of the upper stator assembly 2 at an angle of $2\theta$ ($2\theta = 90°$). Stator notches (six each) are formed in opposing curved surfaces of the stator magnetic pole portions 6A and 7A at predetermined angular intervals of 30° to coincide with the stator notches 13 and 14 of the upper stator assembly 2. Since the stator notches of the lower stator assembly are formed at the same positions below the stator notches 13 and 14 of the upper stator assembly 2, they cannot be seen in the plan view of FIG. 1(a).

Figure 6:
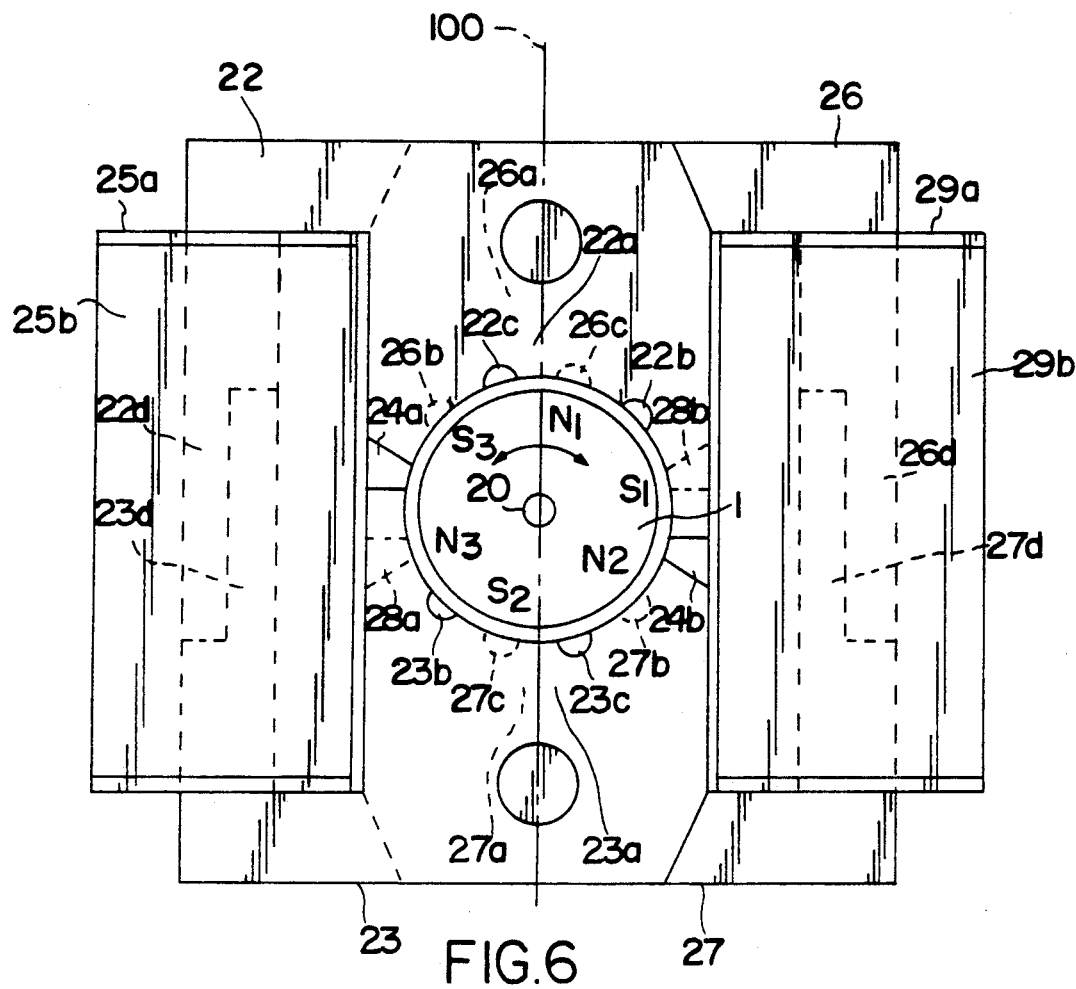
FIG. 6 is a plan view of a rotor magnet and an upper stator assembly in a conventional stepping motor.
Figure 7:
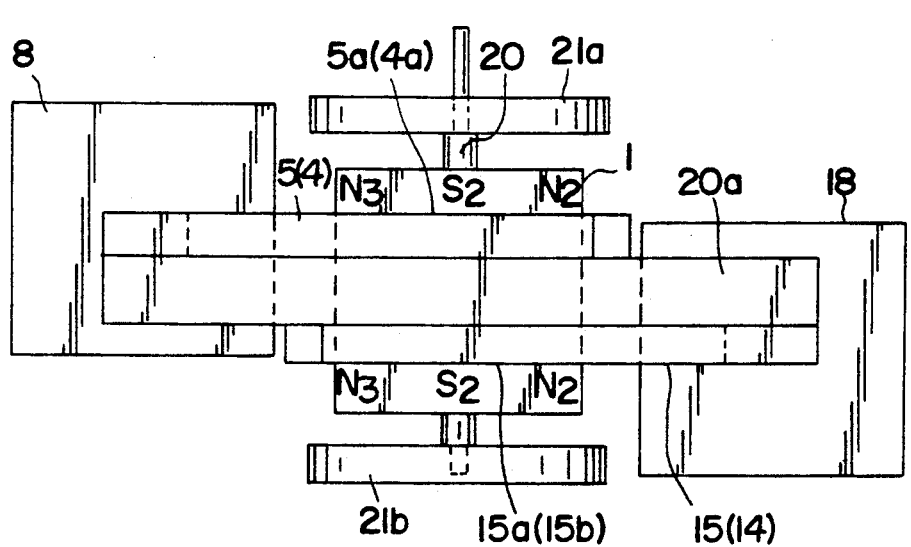
FIG. 7 is a plan view of the rotor magnet and a lower stator assembly in the conventional stepping motor.

In FIG. 2, reference numeral 30 denotes a case consisting of an upper case 31 and a lower case 32. A rotor magnet 1, two stator assemblies 2 and 16, a gear transmission mechanism 33, and the like are housed in the case 30. Three pairs, i.e., six magnetic poles $N_1$, $N_2$, $N_3$, $S_1$, $S_2$, and $S_3$ (FIG. 1(a)) are formed on the outer surface of the rotor magnet 1 in the same manner as in the conventional structure shown in FIGS. 6 and 7. The rotor magnet 1 is rotatably and axially supported by tenons 34 and 35 projecting from the inner surfaces of the upper and lower cases 31 and 32. A gear 36 integrally projects from the central portion of the upper surface of the rotor magnet 1. The upper and lower stator assemblies 2 and 16 respectively forming magnetic circuits through the rotor magnet 1 are interposed between the upper and lower cases 31 and 32, stator gap central lines $L_1$ and $L_2$ cross at an angle of $\gamma = 90°$, and are respectively inclined at $\theta = 45°$ with respect to the X- and Y-axes. An intermediate plate 37 of a nonmagnetic material for preventing a magnetic interference between the two stator assemblies is interposed between the assemblies 2 and 16.

Upon energization of the excitation coils 5 and 19, stators 3, 4, 17, and 18 of the stator assemblies 2 and 16 are excited to rotate the rotor magnet 1 in a desired direction. The rotation of the magnet 1 is then reduction-transmitted to a minute-hand shaft 43 via the gear 36, a fourth gear 38, a small gear 39, a third gear 40, a small gear 41, and a second gear 42, thereby rotating the minute-hand shaft 43 once per hour. At the same time, the rotation of the second gear 42 is reduction-transmitted to an hour-hand shaft 47 via a small gear 43A, a first gear 44, a small gear 45, and an hour-hand gear 46, thereby rotating the hour-hand shaft 47 once per 12 hours. The minute-hand shaft 43 is fitted under pressure in a central hole 48 of the second gear 42, and is rotated integrally with the second gear 42. The lower end portion of the shaft 43 is loosely fitted in and extends through the central hole of the fourth gear 38, and is rotatably and axially supported by a bearing hole 49 formed in the inner surface of the lower case 32. The upper end portion of the shaft 43 rotatably and axially supports the hour-hand shaft 47. Shaft portions 50A and 50B integrally project from the central portions of the upper and lower surfaces of the third gear 40, and are rotatably and axially supported by bearing holes 51 and 52 formed in the upper and lower cases 31 and 32, respectively. The first gear 44 is rotatably fitted on the upper shaft portion 50A.

The operation of the stepping motor with the above structure will be described below.

The rotor magnet 1 stands still in a state shown in FIG. 1(a). In this state, assume that currents are supplied to the excitation coils 5 and 19 of the stator assemblies 2 and 16 to excite the stators 3, 4, 17, and 18, so that the left stators 3 and 17 are magnetized in the S pole, and the right stators 4 and 16 are magnetized in the N pole. In FIG. 1(a), a vertically overlapping region of the N poles is indicated by a hatched portion I, and a vertically overlapping region of the S poles is indicated by a hatched portion II. The three pairs, i.e., six magnetic poles are formed on the outer surface of the rotor magnet 1, and assume that the magnetic pole $S_2$ is attracted toward the region I, and the magnetic pole $N_1$ is attracted toward the region II. If the magnetic field strength from the N pole to the S pole of the upper stators 3 and 4 is represented by $\alpha$ and the magnetic field strength from the N pole to the S pole by the lower stators 17 and 18 is represented by $\alpha'$, an angle defined by these vectors $\alpha$ and $\alpha'$ is equal to a crossing angle $\gamma (= 90°)$ of the stator gap central lines $L_1$ and $L_2$, and the vectors $\alpha$ and $\alpha'$ are directed to the left in FIG. 1(b) to be inclined by $\theta = 45°$ with respect to the X- and Y-axes, respectively. Therefore, a synthesized vector $\beta$ of these vectors $\alpha$ and $\alpha'$ is directed to the left in FIG. 1(b), and is given by $\sqrt{2}\alpha$.

Figure 3A:
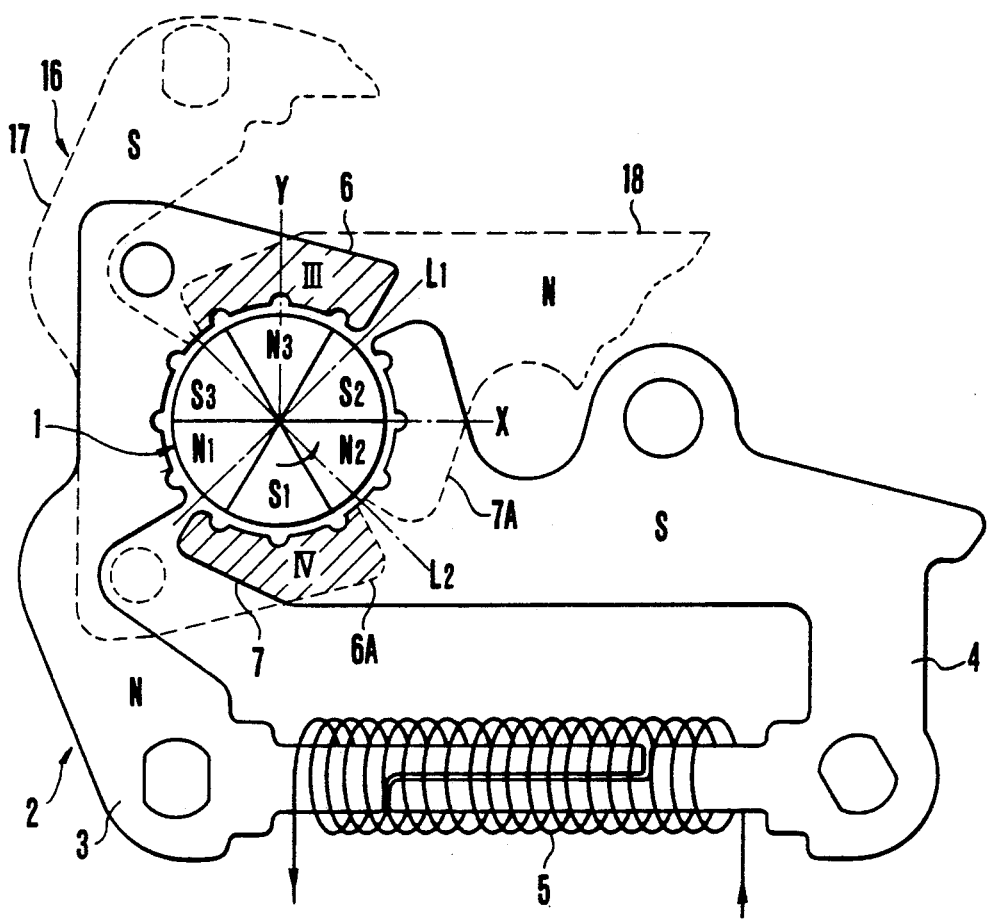
FIG. 3(a), FIG. 4(a), and FIG. 5(a) are views for explaining an operation.
Figure 3B:
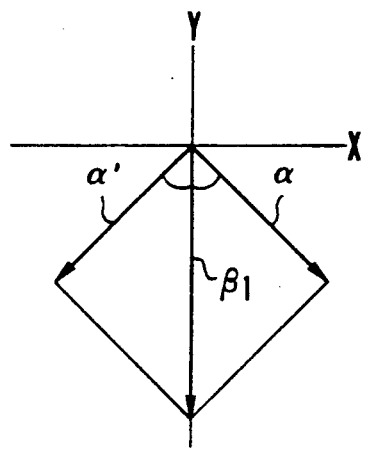
FIG. 3(b), FIG. 4(b), and FIG. 5(b) are vector charts of magnetic fields.

Assuming that the polarities of only the upper stators 3 and 4 are inverted so that the stator 3 is magnetized in the N pole and the stator 4 is magnetized in the S pole while the polarities of the lower stators 17 and are left unchanged, as shown in FIG. 3(a), a vertically overlapping range of the N poles is indicated by a hatched portion III in FIG. 3(a), and a vertically overlapping region of the S poles is indicated by a hatched portion IV. At this time, the rotor magnet 1 is rotated counterclockwise through 30°, so that the magnetic pole $N_3$ is attracted to the region III, and the magnetic pole $S_1$ is attracted to the region IV. The magnetic field strength $\alpha$ from the upper N pole to the S pole and the magnetic field strength $\alpha'$ from the lower N pole to the S pole are directed downward, as shown in FIG. 3(b), and are inclined at 45° with respect to the X- and Y-axes, respectively. Therefore, a synthesized vector 81 of these vectors $\alpha$ and $\alpha'$ is directed downward in FIG. 3(b), and an angle defined between the vectors $\alpha$ and $\alpha'$ is 90°. Therefore, the synthesized vector is equal to $\sqrt{2}\alpha = \beta$.

Figure 4A:
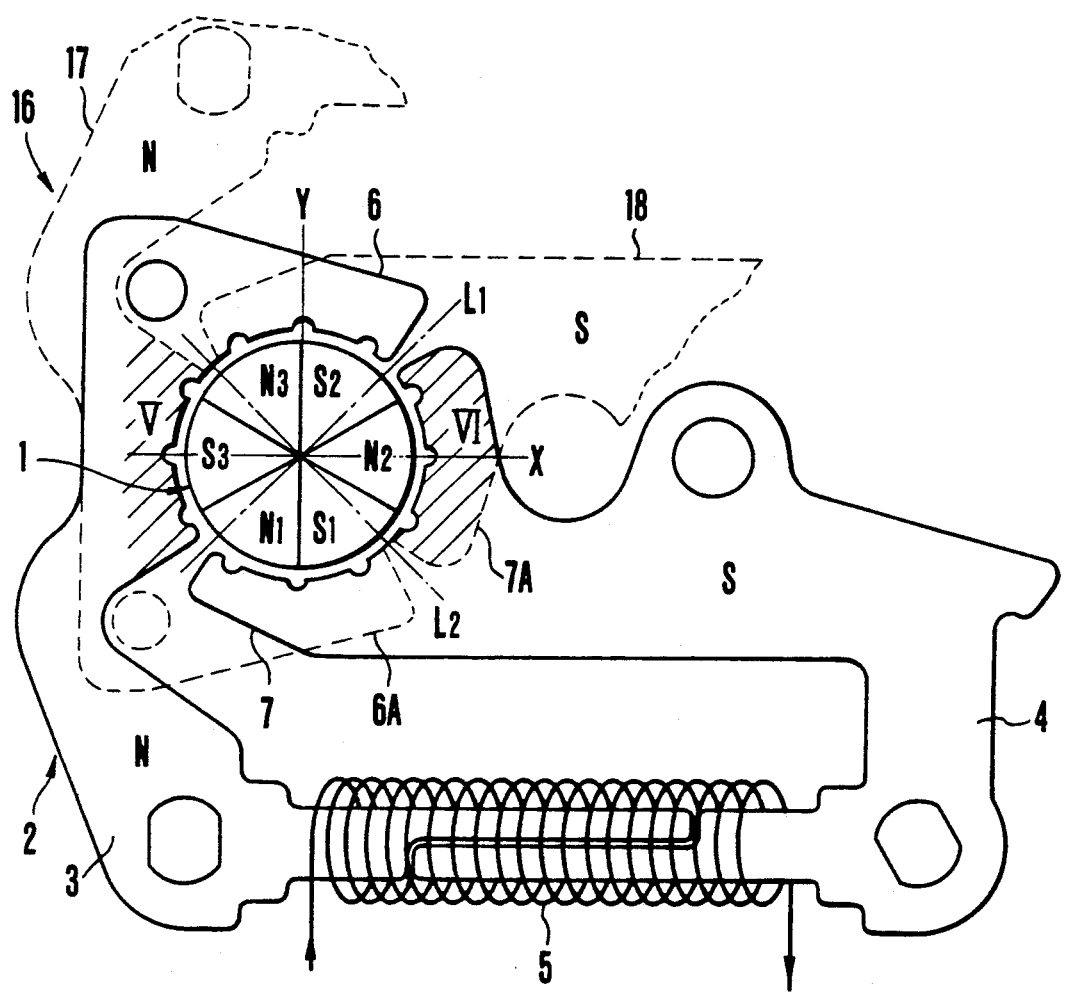
Figure 4B:
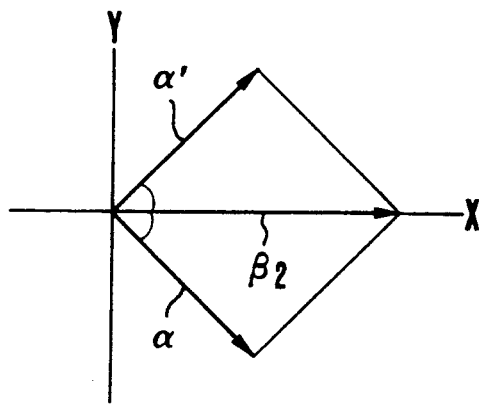

When the polarities of the lower stators 17 and 18 are inverted while the polarities of the upper stators 3 and 4 are left unchanged, as shown in FIG. 4(a), a vertically overlapping region of the N poles is indicated by a hatched portion V and a vertically overlapping region of the S poles is indicated by a hatched portion VI. Therefore, the rotor magnet 1 is rotated counterclockwise through 30°, so that the magnetic pole $S_3$ is located at the center of the region V, and the magnetic pole $N_2$ is located at the center of the region VI. The magnetic field strengths $\alpha$ and $\alpha'$ at that time are directed to the right in FIG. 4(b), and are inclined at 45° with respect to the X- and Y-axes, respectively. In this case, since the angle defined between the vectors $\alpha$ and $\alpha'$ is 90°, a synthesized vector $\beta_2$ is directed to the right, and is equal to $\sqrt{2}\alpha = \beta = \beta_1$.

Figure 5A:
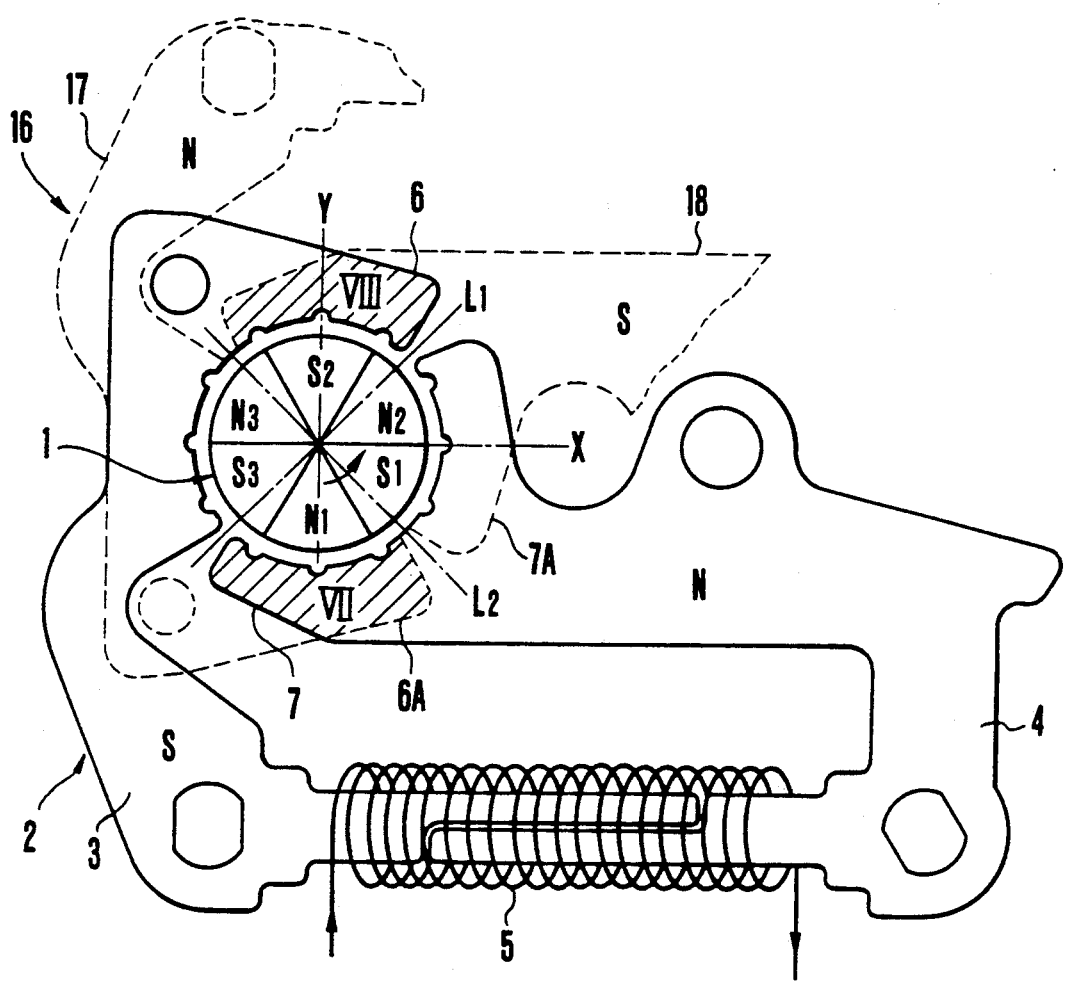
Figure 5B:
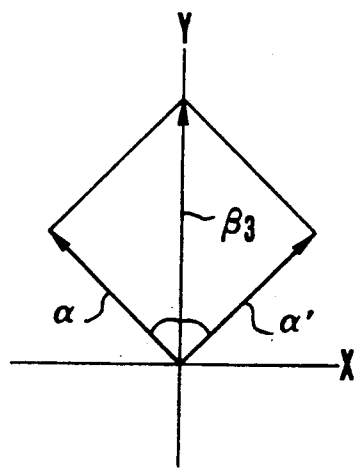

When the polarities of only the upper stators 3 and 4 are inverted while the polarities of the lower stators 17 and 18 are left unchanged, as shown in FIG. 5(a), a vertically overlapping region of the N poles is indicated by a hatched portion VII and a vertically overlapping region of the S poles is indicated by a hatched portion VIII. Thus, the rotor magnet 1 is further rotated counterclockwise through 30°, so that the magnetic pole $N_1$ opposes the region VII, and the magnetic pole $S_2$ opposes the region VIII. The upper and lower magnetic field strengths $\alpha$ and $\alpha'$ are directed upward, and have the same magnitude, as shown in FIG. 5(b). These vectors are inclined at 45° with respect to the X- and Y-axes. Therefore, a synthesized vector of these vectors is directed downward, and is equal to $\sqrt{2}\alpha = \beta = \beta_1 = \beta_2$.

More specifically, according to the present invention, the stator gap central lines $L_1$ and $L_2$ of the two stator assemblies 2 and 16 cross each other at an angle of 90°, so that the angle defined between the magnetic field strengths $\alpha$ and $\alpha'$ can be kept constant even if the excitation patterns of the stators 3, 4, 17, and 18 are changed. Therefore, the synthesized vector $\beta$ can be kept constant. As a result, a torque applied to the rotor magnet 1 can also be kept constant, thus improving stepping angle precision for a timepiece.

Stator notches 13 and 14 formed on stator magnetic pole portions 6 and 7 will be described below. In FIG. 1(a), six stator notches 13 are formed at equal angular intervals of 30° over a range of about 180° on a surface of the stator magnetic pole portion 6, which opposes the rotor magnet 1. Similarly, six stator notches 14 are formed at equal angular intervals of 30° on the stator magnetic pole portion 7. Although not shown, stator notches are similarly formed on lower stator magnetic portions 6A and 7A. These stator notches 13 and 14 serve to determine a still position of the rotor magnet 1, and are respectively arranged at positions opposing boundary portions of the magnetic poles $N_1$, $N_2$, $N_3$, $S_1$, $S_2$, and $S_3$ and the circumferential centers of these magnetic poles in a still state of the rotor magnet 1.

In FIG. 1(a), since a central angle (an angle of a range of one magnetic pole) is 60°, the magnetic pole $N_1$ of the still rotor magnet 1 opposes one stator notch 13 at its central portion where the magnetic field strength is maximized. Boundary portions between the magnetic pole $N_1$ and the adjacent magnetic poles $S_1$ and $S_3$ oppose the stator notches 13 adjacent to that opposing the pole $N_1$. The same applies to the magnetic pole $S_2$ on a side opposite to the magnetic pole $N_1$.

Therefore, when the rotor magnet 1 stands still, since three points, i.e., the central and two end portions of each of the magnetic poles $N_1$ and $S_2$ oppose the stator notches, they are magnetically balanced. Thus, the rotor magnet 1 can stably stand still without causing a rotational error.

As described above, according to the present invention, in a stepping motor for a timepiece, in which two stator assemblies are disposed around a rotor magnet to have a gap therebetween and are two-phase excited, the stator gap central lines of the two stator assemblies cross each other at an angle of 90° when viewed from the axial direction of the rotor magnet. Therefore, in any combinations of excited stators, a synthesized vector of magnetic field strengths can be kept constant, thus obtaining stable stepping angle precision and torque.

Since stator notches are formed on surfaces, opposing the rotor magnet, of stator magnetic pole portions at positions opposing the central portions of and two boundary portions of the magnetic poles of the rotor magnet in a still state of the rotor magnet, a large still holding force can be obtained in a still state of the rotor magnet, and the still position of the rotor magnet can become stable. As a result, the stepping motor having high stepping angle precision can be obtained.

Therefore, even when a pulse current having a small pulse width is flowed to drive a rotor magnet and the rotor magnet is stopped by a small braking force so as to minimize current consumption, the rotor magnet can be stopped at a correct position upon effects of the notches. For this reason, the second hand of a timepiece can be moved at equal angular intervals.

What is claimed is:

1. A stepping motor for a timepiece, comprising:
    a rotatable rotor magnet on an outer surface of which magnetic poles having different polarities are alternately formed; and
    two stator assemblies, each comprising a pair of stators opposing around said rotor magnet to have a gap and having stator magnetic pole portions, and an excitation coil for exciting said pair of stators, for supplying currents to said excitation coils to rotate said rotor magnet,
    wherein said two stator assemblies are disposed to be separated by a predetermined distance in an axial direction of said rotor magnet, so that stator gap central lines of said two stator assemblies cross each other at an angle of 90° when viewed from the axial direction; and
    wherein stator notches are formed on said stator magnetic pole portions of said stators at positions opposing boundary positions between the magnetic poles of said rotor magnet and positions opposing central portions of the magnetic poles of said rotor magnet when said rotor magnet stands still.

2. A stepping motor according to claim 1, wherein three pairs of the magnetic poles of said rotor magnet are formed, and six stator notches are formed at equal angular intervals of 30° on each of said stator magnetic pole portions over a range of about 180°.

* * * * *

UNITED STATES PATENT AND TRADEMARK OFFICE
CERTIFICATE OF CORRECTION

PATENT NO. : 5,132,578
DATED : July 21, 1992
INVENTOR(S) : Iwasa et al.

It is certified that error appears in the above-identified patent and that said Letters Patent is hereby corrected as shown below:

Column 8, line 47, replace
"boundary positions between the magnetic" with
--boundary portions between the magnetic--

Signed and Sealed this

Twelfth Day of September, 1995

Attest:

BRUCE LEHMAN

Attesting Officer

Commissioner of Patents and Trademarks